Patented Feb. 17, 1931

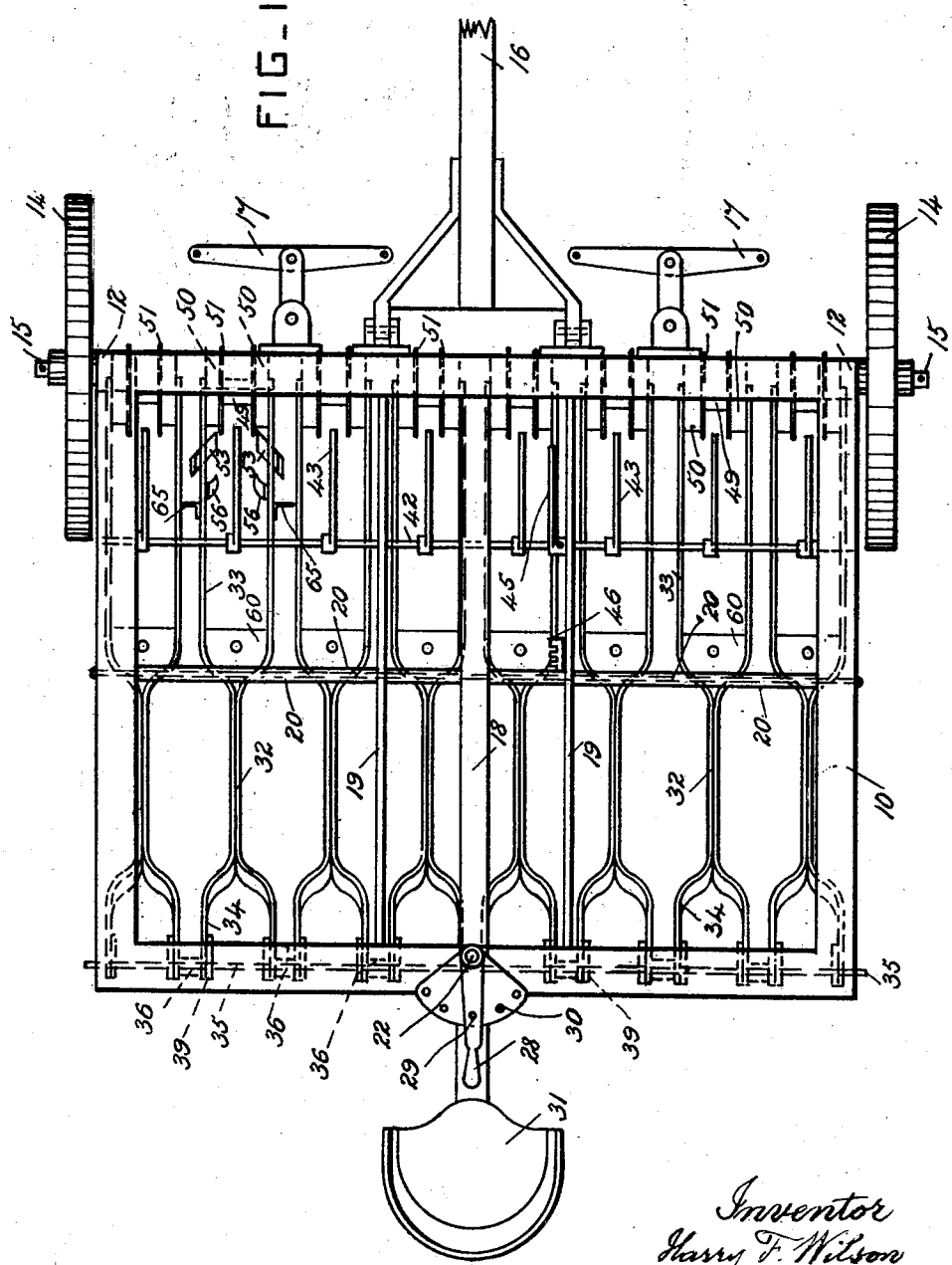

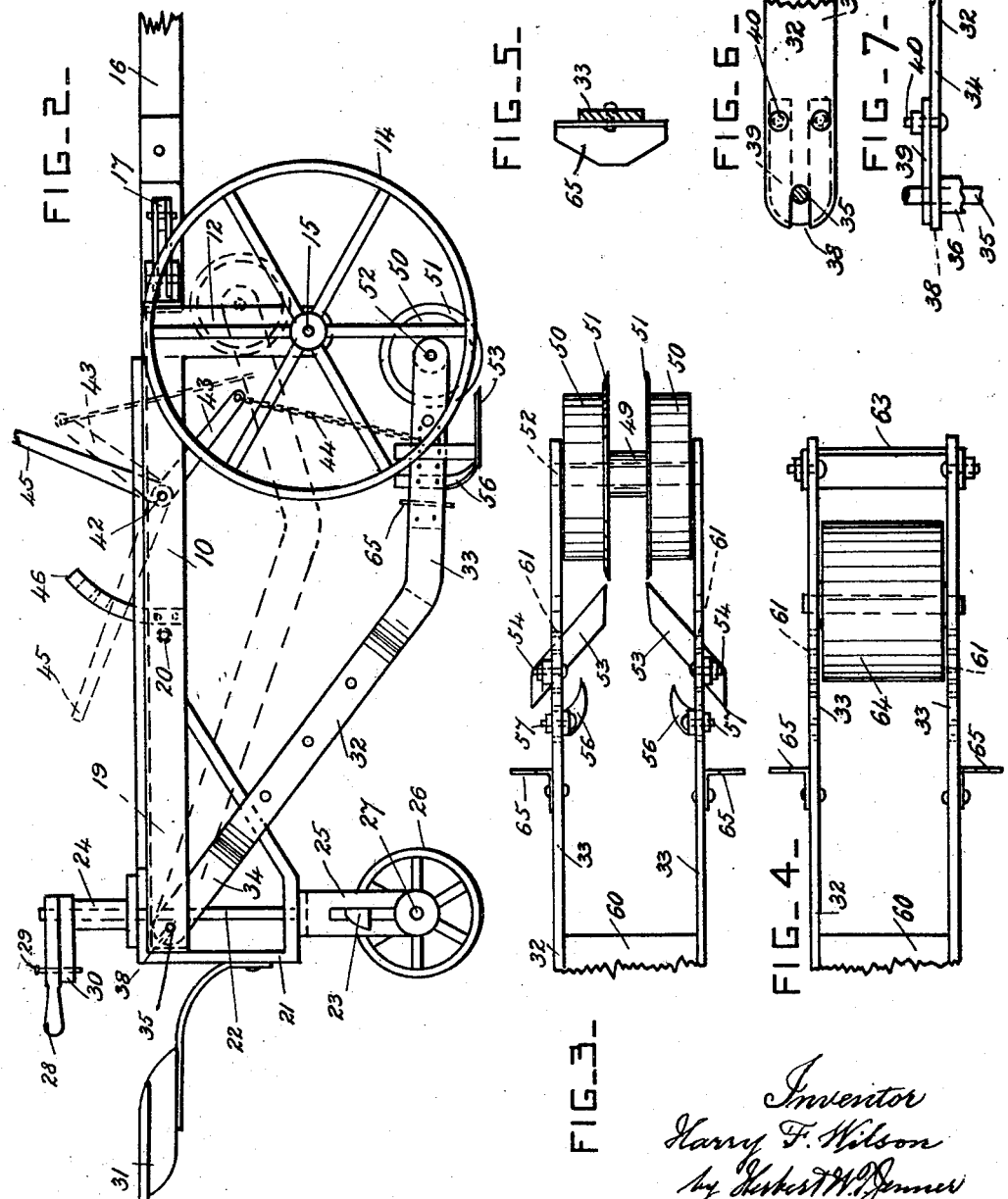

1,792,954

UNITED STATES PATENT OFFICE

HARRY F. WILSON, OF SACRAMENTO, CALIFORNIA, ASSIGNOR OF ONE-HALF TO JOHN R. BISHOP, OF VAN VLEET, MISSISSIPPI

COTTON CHOPPER AND CULTIVATOR

Application filed April 4, 1930. Serial No. 441,564.

This invention relates to machines for chopping and cultivating cotton, but which may be used for other similar crops. This invention consists in the novel construction and combination of the parts hereinafter fully described and claimed whereby the cotton plants are chopped by driving the machine crosswise of the rows to remove the plants that are not required, and also to plow, scrape or work the earth between the plants. The machine is also used to cultivate the growing plants left unchopped. The machine is then driven lengthwise of the rows of plants, and a suitable change is made in the scrapers, chopping blades, or other similar implements.

In the drawings, Fig. 1 is a plan view of a cotton chopper and cultivator constructed according to this invention. Fig. 2 is a side view of the machine. Fig. 3 is a detail plan view of part of one of the arms, as used for cotton chopping. Fig. 4 is a detail plan view of one of the arms as used for cultivating subsequent to chopping. Fig. 5 is a detail side view of a guide used to preserve the spacing of the arms. Fig. 6 is a detail side view of the forked rear end portion of one of the arms. Fig. 7 is a plan view of the same.

The machine is provided with a rectangular frame 10, having uprights 12 which project downwardly from its front corners. The front ground wheels 14 are journaled on pins 15 which project from the lower parts of the uprights 12. The machine is drawn along by two horses, and it has a draft pole 16 pivoted to the front part of the frame 10, and whiffletrees 17 which are also pivoted to the front part of the frame. The frame has also a central longitudinal bar 18 arranged in line with the draft pole, and longitudinal bars 19 spaced apart from the bar 18, and held in place by distance pieces 20.

A bracket 21 is secured on the underside of the rear part of the frame, and a vertical steering shaft 22 is journaled in this bracket, and in a steering post 24 at the top of the frame. The lower part of the steering shaft 22 has a forked member 25 secured to it, and 26 is the ground steering wheel journaled on a pin 27 in the forked member 25. A steering handle 28 is secured to the upper part of the steering shaft, and is provided with a pin 29 for locking it to a perforated plate 30 at the top of the steering post. The handle is locked so that the machine can be drawn in a straight line, or on a line curved to the right or to the left. A seat 31 for the driver is secured to the bracket 21 to the rear of the steering handle, and rests 23 for his feet are provided on the bracket 25.

The machine is provided with a series of arms 32 for chopping and cultivating. These arms are angle-shaped, and have forked front end portions 33. When the machine is at work, as shown in full lines in Fig. 2, the rear and main parts of the arms are downwardly and forwardly inclined, and the front end portions 33 are substantially parallel to the ground. The rear parts of the arms 32 have forked rear end portions 34, which are pivoted on a rod 35 secured to the rear part of the frame 10, and extending crosswise of it. Eight arms 32 are preferably provided, and each arm is preferably formed of two plates formed right and left, and having their middle parts riveted together, so that the end portions of the arms are forked. The forked rear end portions of the arms 32 are held apart by spacing pieces 36 on the rod 35, and when fewer arms are used they are spaced apart by longer spacing pieces, which are not shown.

The forked rear end portions 34 of the arms have slots 38 so that they can be slid onto the rod 35 independently of each other, and 39 are loop-shaped plates secured to the parts 34 by bolts 40 so as to hold the slots in engagement with the rod, and permit the arms 32 to be moved pivotally. A shaft 42 is journaled in the frame 10 over the forked front ends of the arms 32, and lever arms 43 are secured on this shaft, and are connected to the arms 32 by chains 44, or other flexible connections. A lever 45 is also secured to the shaft 42, and is used for raising and lowering the arms 32 pivotally. When the lever 45 is moved by hand to raise the arms 32 to the position shown by dotted lines in Fig. 2, it is sprung into engagement with a catch 46 secured to one of the bars 19 of the frame.

When the machine is used as a cotton chopper, the arms 32 have gage rollers 50 and cutting disks 51 journaled on pins 52 in the forked front end portions 33 of the arms. The cutting disks 51 are separated by a distance piece 49, and the plants which are not chopped away pass uninjured between the two cutting disks. Chopper blades or scrapers 53 are secured to the parts 33 by bolts 54, and are formed right and left, and are adapted to chop away all plants except those which pass between the disks 51, when the machine is driven crosswise of the rows of cotton plants, with the rollers 50 running on the ground. These chopper blades are made of various forms, and are adjustably connected to the arms by the bolts 54, and the blades 53 are preferably of the form shown in the drawings.

Additional adjustable blades, teeth or cutters 56 are also secured to the parts 33 by bolts 57, and are used to plow, harrow or cultivate the soil to the rear of the chopper blades and rollers, when desired, and during the chopping operation.

A block 60 is also secured in the forked parts 33 to stiffen them, and plows or cultivator blades may also be secured to this block. The forked parts 33 of the arms have two rows of bolt holes 61, arranged one above the other, so that various forms of blades or cutters may be attached to the arms, as is desirable from time to time.

The arms 32 are all pivoted independently on the rod 35 so that each arm rises and falls independently of the others. When the machine is at work the free front end portions of the arms are supported by means of the gage rollers 50 which run upon the surface of the ground and follow its contour. All the arms can be raised simultaneously by means of the mechanism provided with lever 45, and having flexible connections attached to the arms. Each arm can be removed and replaced without displacing the pivot rod 35 or any of the other arms mounted on the pivot rod.

When the machine is used as a cultivator, subsequent to being used as a cotton chopper, it is preferably drawn lengthwise of the rows of plants, and certain of the arms 32 are removed, so that the remaining arms may work between the plants. The arms 32 then have different implements secured to them, and in Fig. 4 one of the arms is shown provided with a cutter or scraper 63 extending across the front end portion of its forked part 33, and a gage roller 64 is journaled in the forked part 33 behind the blade or cutter 63.

In order to prevent the arms 32 from interfering or obstructing each other, they are provided with double tapered guide plates 65. These plates are secured to the forked parts 33 and are arranged vertically, and so that their middle parts which are wider than their end portions may bear against the adjacent forked parts. The tapering upper and lower parts of the plates 65 guide the arms when raised unevenly, and assist in keeping the arms 32 spaced apart at proper intervals or positions.

What I claim is:

1. In a cotton chopper and cultivator, a wheeled frame, a series of downwardly and forwardly inclined arms having their upper and rear end portions pivoted independently to the rear part of the frame, said arms being provided with blades at their lower and front ends, and mechanism for raising and lowering the front end portions of the said arms simultaneously, the front end portions of the said arms being supported by the ground when not raised by the said mechanism, and each arm being free to rise and fall independently of the other arms.

2. A machine as set forth in claim 1, said machine having ground wheels journaled one on each side of the front end portion of its frame, and a steering ground wheel pivoted on a vertical axis at the middle of the rear part of its frame and provided with means for adjusting it pivotally on its axis.

3. In a cotton chopper and cultivator, a wheeled frame, a series of angle-shaped arms having forwardly and downwardly inclined rear ends and main portions pivoted independently to the rear part of the frame, said arms being provided with blades at their lower and front ends, and gage rollers which run on the ground and support the front end portions of the said arms in a substantially horizontal position and permit each arm to rise and fall independently of the other arms.

4. In a cotton chopper and cultivator, a wheeled frame, a series of downwardly and forwardly inclined arms having their upper and rear end portions pivoted to the rear part of the frame, each arm being formed of two plates having their end portions offset right and left to form forked end portions, and intermediate parts of the plates being secured together, blades secured to the lower and front forked end portions of the arms, and means for supporting the lower and front end portions of the said arms.

5. In a cotton chopper and cultivator, a wheeled frame, a series of downwardly and forwardly inclined arms having their rear and upper end portions pivoted to the rear part of the frame, said arms being provided with forked front end portions, cutter disks spaced apart in pairs and having gage rollers on their outer sides, said disks and rollers being journaled in the forked front end portions of the said arms, blades secured to the forked front end portions of the arms to the rear of the said disks and rollers, and means for supporting the front end portions of the said arms.

6. A machine as set forth in claim 5, and having also double tapered guide plates secured to the said arms and arranged vertically and projecting towards the adjacent arms to maintain the distance between the arms.

7. A machine as set forth in claim 4, the said frame being provided with a pivot rod, and the upper and rear forked end portions of the said arms being provided with slots and detachable plates which engage with the pivot rod and permit each arm to be removed and replaced without displacing the pivot rod.

In testimony whereof I affix my signature.

HARRY F. WILSON.